Feb. 26, 1963 H. CHEVALLAZ 3,079,055
DEVICE FOR THE AUTOMATIC HOOKING OF A
FILM ON A RECEIVING SPOOL
Filed Jan. 17, 1961 2 Sheets-Sheet 1

INVENTOR
HENRI CHEVALLAZ

Feb. 26, 1963

H. CHEVALLAZ 3,079,055

DEVICE FOR THE AUTOMATIC HOOKING OF A
FILM ON A RECEIVING SPOOL

Filed Jan. 17, 1961

INVENTOR
HENRI CHEVALLAZ
BY Emery L. Groff
Atty

United States Patent Office 3,079,055
Patented Feb. 26, 1963

3,079,055
DEVICE FOR THE AUTOMATIC HOOKING OF A FILM ON A RECEIVING SPOOL
Henri Chevallaz, Yverdon, Vaud, Switzerland, assignor to Paillard S.A., Sainte-Croix, Switzerland, a corporation of Switzerland
Filed Jan. 17, 1961, Ser. No. 83,248
Claims priority, application Switzerland Jan. 19, 1960
4 Claims. (Cl. 226—91)

Devices are already known for the automatic hooking of a film on to the receiving or take-up spool of a cinematographic apparatus, comprising two guiding elements mounted for oscillation in such a manner as to be capable of penetrating between the flanges of the spool for guiding the film into the slot of the hub of this spool, one of the elements having a part adapted to engage in the slot of the spool for maintaining said latter in a position permitting the introduction of the film into said slot.

In a known device of this type, described in the German Patent No. 727,655, the guiding element constitutes a passage or conduit into which the film passes. The extremity of this conduit is placed in contact with the hub of the spool, opposite the slot, by means of a spring acting on the conduit. When the film is engaged in the slot of the spool, the reaction of this tends to withdraw the conduit from the hub, which permits of the driving in rotation of the said spool. Meanwhile the spring continues to press the conduit in the direction of the center of the spool and there result undesirable frictions between the film and this conduit, principally against the edges of the orifice at the extremity of the said conduit.

In another known device, two guiding elements are mounted for oscillation and can be moved, against the action of springs, between the two flanges of the take-up spool, so as to constitute a passage or conduit for the film. This known device is not provided for introducing the extremity of the film into the slot of the hub of the spool, but solely for winding the film on the hub, by reason of the extreme guiding parts which surround said latter. These two guiding elements are maintained one near the other by a spring notch, and they are spaced one from the other by the effect of the film rolling over the core of the spool. When the winding on the core has reached a sufficient diameter, the two elements are spaced one from the other by an amount such that the notch no longer plays its part as a locking device, its two parts being then released and withdrawn out of the spool by their respective spring. In this device the film is also subjected to considerable frictional forces until the elements have been withdrawn from the spool.

The present invention has for its object to obviate the useless frictional efforts on the film. It has for its object a device for the automatic hooking of a film on a take-up spool of a cinematographic apparatus, comprising two guide elements mounted for oscillation in such a manner as to be capable of penetrating both between the flanges of the spool so as to guide the film into the slot of the hub of this spool, one of said elements having a part adapted to engage the slot of the spool for maintaining said latter in a position permitting the introduction of the film into this slot, characterised in that the other element is disposed in such a manner as to be moved by the film when the extremity of this abuts against the interior of the hub of the spool, this latter element controlling, by this displacement, the withdrawal of the first element from the spool.

One form of construction of the subject of the invention is shown diagrammatically and by way of example in the accompanying drawings, wherein.

The description which follows relates to a cinematographic apparatus for taking views, but it will be understood that it may be applied equally well to a projection apparatus.

Figure 1:
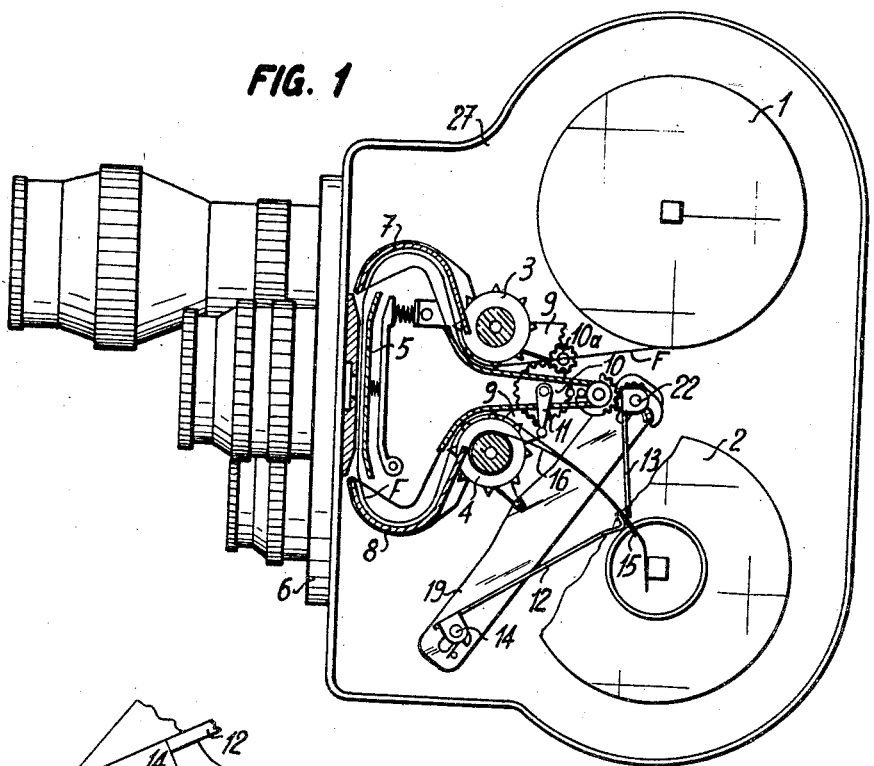
FIG. 1 is a view of a cinematographic apparatus for taking views of which the cover has been removed so as to show the device for the automatic hooking of the film in its position permitting of the hooking of the film during the loading of the camera.

The camera shown in FIG. 1 comprises, in the known manner, a delivery spool 1, a take-up spool 2, two sprocket-wheels 3 and 4, a pressure flap 5 for maintaining the film F applied in the exposure passage. This camera, which is provided with a turret 6 carrying three objectives, is also provided with guides or loop-formers 7 and 8 which permit, as is known, of guiding the film when loading the camera.

Each of the guides 7 and 8 carries a toothed sector 9 gearing with a toothed wheel 10 secured to a crank 11 for manual control for placing said guides in position.

The portion of the mechanism described so far is known and thus does not form part of the invention.

The hooking device comprises two guide elements 12 and 13, the element 12 being hinged, at one of its ends, around a pivot 14 secured to the plate 27 of the camera. Its other end has a tooth 15 adapted to be engaged in a slot of the take-up spool 2 and to momentarily stop said spool, which is frictionally driven in a well-known manner. The free end of element 12 is connected to an elastic band 16 which is wound on the central part of the sprocketwheel 4, between the two projections provided at the edges of this. This band 16 may be constituted of spring steel. This part of the hooking device is similar to that described in U.S. patent application Serial Number 828,198 filed July 20, 1959, now abandoned.

Figure 2:
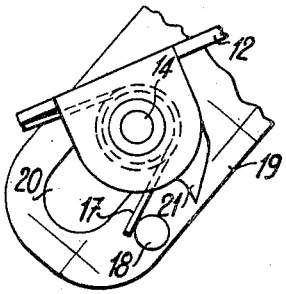
FIGS. 2 and 3 show, to a larger scale, two details of the device visible in FIG. 1.

The hinging of the element 12 on the pivot 14 is shown to a larger scale in FIG. 2 which shows a spring 17 bearing against a peg 18 of a movable part 19, so as to cause the element 12 to turn and to bring it into contact with the hub of the spool 2.

The part 19 has an elongated hole 20 which permits it to slide longitudinally on the pivot 14 and thus withdraw the guiding element 12 away from the spool 2, by reason of the action applied by the peg 18 of this movable part 19 on a projection 21 secured to the element 12.

Figure 3:
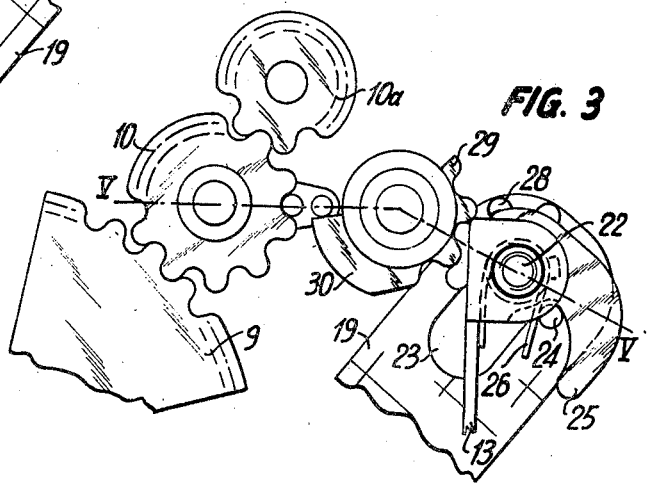

The guide element 13 is hinged on a pivot 22, as shown in detail in FIG. 3. This pivot 22 constitutes a guide for an elongated hole 23 provided in the movable part 19, which carries a second peg 24 capable of co-operating with a projection 25 secured to the element 13 for removing said latter from the spool 2. The element 13 is subjected to the action of a spring 26 which bears against the projection 24 in order to bring the end of this element opposite that of the guide element 12, so as to form a kind of conduit or funnel adapted to direct the end of the film F so as to cause it to penetrate into the slot of the hub of the spool.

Figure 5:
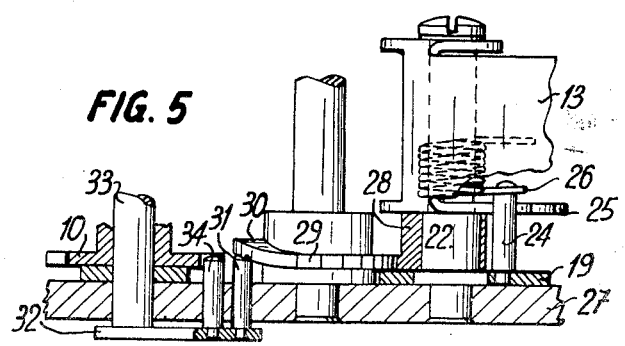
FIG. 5 is a partial section on the line V—V of FIG. 3.

The projection 25 of the element 13 is formed by a folded part of said latter, as shown in FIG. 5. The element 13 is also secured to a partly toothed wheel 28 gearing with teeth of a wheel 29 having a part 30 in the form of an inclined ramp. This part 30 is adapted to press the end of a pin 31 sliding in a hole of the plate 27 and secured to an arm 32 secured to the end of a pusher 33 serving as an axis of rotation of a toothed wheel 10. This arm 32 carries a second projection 34 of which the end is adapted to come into engagement in a peripheral notch of the toothed wheel 10. The pusher 33 is subjected to the action of a spring, not shown, tending to push it upwards, with reference to FIG. 5, in such a manner as to provoke the engagement of the projection 34 in the toothed wheel 10.

The movable part 19 also has a notch 35 in which engages the end of an arm 36 secured to the loop former 8. In this manner the movements of the movable part 19 are synchronised with the lengthening movements of the loop-formers 7 and 8.

The device described operates in the following manner:

For placing a film in position in the camera, the user provokes the placing in position of the loop-formers, against the action of a spring, not shown, which tends to space them from one another. For this purpose the user acts on the handle 11 so as to bring it into the position shown in FIG. 1, the position in which the peg 34 locks the wheel 10 in rotation. During this movement, the toothed wheel 10 gears directly with the toothed sector 9 of the loop-former 8, whilst it drives the loop-former 7 through the medium of a return pinion 10a, which gears with the sector 9 of this latter loop-former.

During this placing in position of the loop-formers 7 and 8, the part 19 is moved by the arm 36 which causes it to occupy the position shown in FIG. 1, and the elements 12 and 13 are engaged between the flanges of the spool 2 under the effect of springs 17 and 26.

The end of the film F is then engaged under the feeder 3 and the driving mechanism of the film is set in operation. The film driven by the feeder 3 is guided by the loop-former 7 so as to engage under the pressure flap 5, then by the loop-former 8 so as to reach the feeder 4. Then the end of the film passes between the resilient band 16 and the element 13 so as to continue up to the slot of the spool 2.

Figure 4:
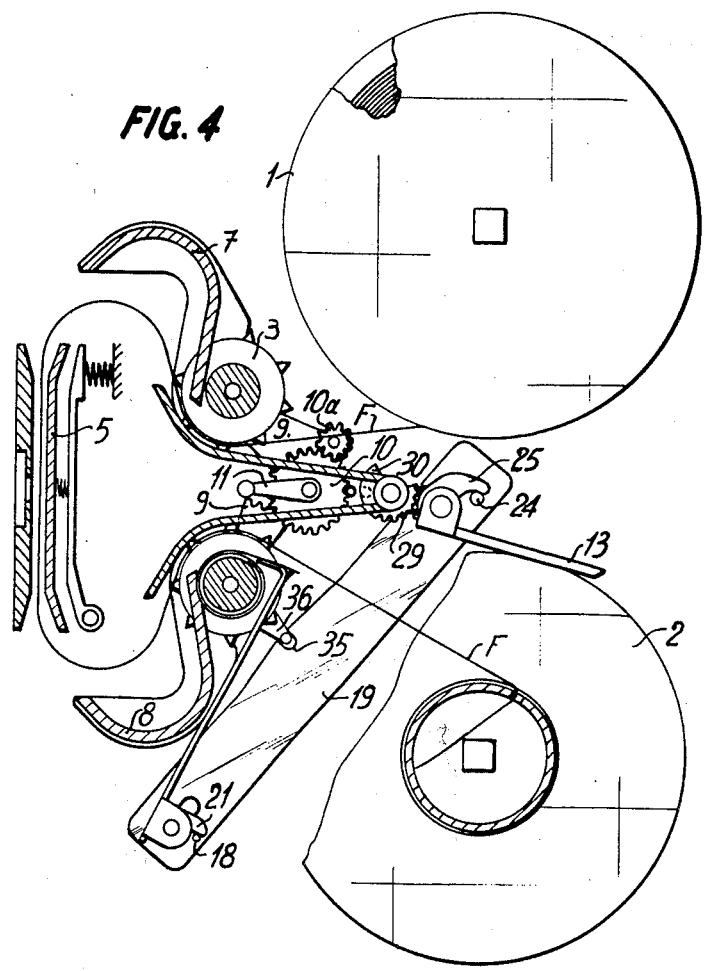
FIG. 4 shows the hooking device in the position which it assumes when the charging is effected to permit of the normal and free functioning of the camera.

When the end of the film, which is driven by the mechanism of the camera, abuts against the core of the spool 2, there is produced a slight ramming of the film against the guide element 13, which is moved against the action of its spring 26. This movement provokes the rotation of the wheel 29 of which the part 30 then moves the assembly 31 to 34 towards the bottom (FIG. 5). The peg 34 thus releases the wheel 10, which permits the loop-formers 7 and 8 to assume the position shown in FIG. 4, under the action of their springs, not shown, in which they are withdrawn from the path of the film. The loop-former 8 thus effects a partial rotation in an anti-clockwise direction, so that its arm 36 causes the movable part 19 to slide so as to move it into the position shown in FIG. 4. During this sliding movement, the pegs 18 and 24 of the part 19 come into contact with the projections 21 and 25 of the guide members 12 and 13 in such a manner as to displace these latter and to withdraw them from the spool 2. From this moment the film follows a normal track and is not subjected to any friction due to any one of the members utilised for placing it into position automatically.

It will be understood that numerous modifications may be made in the device described. In particular, it is possible to omit the guide element 13, in view of the fact that the film has a tendency to bear against the resilinet band 16 of the element 12 by reason of the natural curvature of the film. It will be seen that the element 13, which has been provided, increases the security of operation of the device. If this element 13 is omitted, it should be replaced by another member actuated in such a manner as to be moved by the film so as to provoke the withdrawal of the guide element when the end of the film is engaged in the slot of the spool 2. The member adapted to be displaced by the film may be placed at any point of the path traversed by this, provided in such a manner that it is associated with a device permitting of controlling the withdrawal of the guide elements only when the end of the film is engaged in the hub of the spool 2. Thus the member moved by the film may be placed, for example, at the outlet of the feeder 3 and act on a device driven by the feed mechanism of the film and adapted to provoke the withdrawal of the guide elements when the feed mechanism has produced the movement of the film over a determined length, which is sufficient so that the end of the film has been able to reach the slot of the spool and engage conveniently in this.

I claim:

1. A device for the automatic hooking of a film on a take-up spool of a cinematographic apparatus having a film channel, said spool having two flanges and a hub with a slot, comprising, two guide elements mounted for oscillation in such a manner as to be capable of entering and withdrawing between the flanges of said spool so as to form a channel to guide said film into said slot of the hub of said spool, means for locking said two guide elements between said flanges, the first of said guide elements having a tooth adapted to engage the slot of said spool for maintaining said spool in a locked position permitting the introduction of said film into said slot, the second of said elements disposed on the opposite side of the film as it enters between said flanges and having a free end disposed adjacent said slot in said hub, said channel converging to a point juxtaposed said slot, whereby, when the extremity of said film abuts against the interior of said hub, continued feeding of the film causes the film to back up between said flanges to displace said second element thereby releasing said locking means, and spring means operable upon release of said locking means to withdraw said first and second elements from between said flanges.

2. A device according to claim 1, wherein said two guide elements are each subjected to the action of a spring tending to maintain them in the guiding position between said flanges of said spool, a movable part being provided with stop means adapted to co-operate with said elements so as to withdraw said elements from said spool against the action of said springs, said movable part acted upon by additional spring means tending to displace it for provoking the withdrawal of said elements, said movable part being retained against said spring means by locking means actuated in such a manner as to be unlocked by the movement of said latter element which is provoked by said film.

3. A device according to claim 2, comprising loop-formers and at least one sprocket-wheel, said loop-formers being disposed so as to guide said film into said film channel and movable so as to be withdrawn from the path of said film when the cinematographic apparatus is ready to function, and means connecting said loop-formers to said movable part to permit automatic withdrawal of said loop-formers from the path of said film when said guide elements are withdrawn from said spool.

4. A device according to claim 3, comprising a toothed wheel, a pusher, a spring acting on said pusher, said pusher having a part forming a locking member for said toothed wheel, wherein said two loop-formers each carry a toothed sector gearing with said toothed wheel in order to maintain said loops in their position permitting said film to be placed in position, said pusher being adapted to be moved axially so as to release said toothed wheel and to allow said loop-formers to move away from the path of said film, said guide element adapted to be displaced by said film, being actuated in such a manner as to move said pusher, one of said loop-formers being connected mechanically to said movable part for synchronising the separating movement of said two loop-formers and the withdrawal of said guide elements.

References Cited in the file of this patent

UNITED STATES PATENTS 2,203,655    Lechleitner et al.           June 4, 1940